US009477109B2

(12) United States Patent
Huh et al.

(10) Patent No.: US 9,477,109 B2
(45) Date of Patent: Oct. 25, 2016

(54) METHOD OF MANUFACTURING A DISPLAY PANEL HAVING A DESIRED SHAPE

(71) Applicant: SAMSUNG DISPLAY CO., LTD., Yongin, Gyeonggi-Do (KR)

(72) Inventors: SooJeong Huh, Yongin-si (KR); Byoungyong Kim, Seoul (KR); Junho Song, Seongnam-si (KR); Jeanho Song, Yongin-si (KR); JiEun Lee, Seoul (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 19 days.

(21) Appl. No.: 14/624,152

(22) Filed: Feb. 17, 2015

(65) Prior Publication Data
US 2015/0323829 A1 Nov. 12, 2015

(30) Foreign Application Priority Data

May 8, 2014 (KR) .......................... 10-2014-0054907

(51) Int. Cl.
G02F 1/1333 (2006.01)
G02F 1/1368 (2006.01)
G02F 1/1335 (2006.01)
G02F 1/1339 (2006.01)

(52) U.S. Cl.
CPC ....... *G02F 1/133351* (2013.01); *G02F 1/1339* (2013.01); *G02F 1/1368* (2013.01); *G02F 1/133514* (2013.01); *Y02P 40/57* (2015.11)

(58) Field of Classification Search
CPC . G06F 1/133351; H01L 21/78; H01L 51/56; H01L 2251/566; B23K 26/38
See application file for complete search history.

(56) References Cited

U.S. PATENT DOCUMENTS

| 6,795,154 | B2 | 9/2004 | Uh et al. |
| 7,975,588 | B2* | 7/2011 | Takamatsu ............. B28D 1/225 83/663 |
| 8,120,744 | B2 | 2/2012 | Yoshino et al. |
| 8,216,016 | B2* | 7/2012 | Yamagishi et al. ............. 445/24 |
| 8,325,319 | B2 | 12/2012 | Ikeguchi |
| 2007/0132935 | A1* | 6/2007 | Mori ..................... C03B 33/033 349/153 |
| 2009/0207370 | A1* | 8/2009 | Tsuchiya et al. ............. 349/153 |
| 2012/0235170 | A1 | 9/2012 | Lee |
| 2013/0149802 | A1* | 6/2013 | Kataoka et al. ................ 438/26 |

FOREIGN PATENT DOCUMENTS

| JP | 2003-255362 | 9/2003 |
| JP | 2009-288369 | 12/2009 |
| JP | 2010-204236 | 9/2010 |
| JP | 2011-145489 | 7/2011 |
| WO | 2009154012 | 12/2009 |
| WO | 2009154022 | 12/2009 |

* cited by examiner

Primary Examiner — Joseph L Williams
Assistant Examiner — Jacob R Stern
(74) Attorney, Agent, or Firm — F. Chau & Associates, LLC

(57) ABSTRACT

A method of manufacturing a display panel is provided. The method includes preparing a mother panel, disposing a wheel unit on the mother panel, and cutting the mother panel along a plurality of cutting lines using the wheel unit. The mother panel includes a boundary of the mother panel and a plurality of unit panels within the boundary. Each of the plurality of unit panels includes a first substrate, a second substrate facing the first substrate, a display area, and a sealant. The sealant is disposed between the first and second substrates to couple the first and second substrates. The wheel unit applies different pressures to the first and second substrates to cut the first and second substrates when the mother panel is cut.

20 Claims, 10 Drawing Sheets

METHOD OF MANUFACTURING A DISPLAY PANEL HAVING A DESIRED SHAPE

CROSS-REFERENCE TO RELATED APPLICATION

This patent application claims priority under 35 U.S.C. §119 to Korean Patent Application No. 10-2014-0054907, filed on May 8, 2014, in the Korean Intellectual Property Office, the disclosure of which is incorporated by reference herein in its entirety.

TECHNICAL FIELD

The present inventive concept relates to a method of manufacturing a display panel, and more particularly, to a method of manufacturing a display panel having a desired shape.

DISCUSSION OF THE RELATED ART

A display panel of a display device may include a first substrate, a second substrate facing the first substrate, and an image display layer disposed between the first and second substrates.

To increase manufacturing yield of the display panel, thin film transistor substrates may be formed on a large-sized mother substrate and color filter substrates may be formed on another mother substrate, and thus the two mother substrates may be coupled to each other to form a mother panel (e.g., a mother glass). In this case, the mother panel may be cut into a plurality of unit panels using a particular cutting method.

SUMMARY

According to an exemplary embodiment of the present inventive concept, a method of manufacturing a display panel is provided. The method includes preparing a mother panel, disposing a wheel unit on the mother panel, and cutting the mother panel along a plurality of cutting lines using the wheel unit. The mother panel includes a boundary of the mother panel and a plurality of unit panels within the boundary. Each of the plurality of unit panels includes a first substrate, a second substrate facing the first substrate, a display area, and a sealant. The sealant is disposed between the first and second substrates to couple the first and second substrates. The sealant is disposed surrounding the display area. The wheel unit applies different pressures to the first and second substrates to cut the first and second substrates when the mother panel is cut.

The sealant may include a first sealant and a second sealant. The first sealant may be disposed between display areas adjacent to each other among the display areas of the plurality of unit panels. The second sealant may be disposed surrounding sides of the display area facing the boundary of the mother panel, and each of the plurality of unit panels may include long sides in a first direction and short sides in a second direction crossing the first direction.

The plurality of cutting lines may include first to third cutting lines. The first cutting lines may be disposed between the display areas adjacent to each other and may extend in the first and second directions. The second cutting lines may be disposed adjacent to an outer side of the second sealant and may extend in the first and second directions. The third cutting lines may be spaced apart from the second cutting lines by a predetermined distance in the second direction and may extend in the first direction. The third cutting lines may be disposed to correspond to the second cutting lines in a one-to-one correspondence and disposed at farther positions than the second cutting lines from the second sealant.

The second lines may be spaced apart from the outer side of the second sealant by a first distance.

The first distance may be about 0.3 mm.

The cutting of the mother panel may include disposing the wheel unit at the first cutting lines, applying a first pressure to the first cutting lines of the second substrate through the wheel unit to form a first crack and a second crack, applying a second pressure to the first cutting lines of the first substrate through the wheel unit to form a third crack and a fourth crack, and applying an external force to the first and second substrate to cut the first and second substrates along the first cutting lines. The second crack may be formed by expanding the first crack. The fourth crack may be formed by expanding the third crack. The second pressure may be greater than the first pressure.

The third crack may have a depth greater than a depth of the first crack, and the fourth crack may have a depth greater than a depth of the second crack.

The first crack may have a depth corresponding to about 5% to about 8% of a thickness of the second substrate.

A sum of a depth of the first crack and a depth of the second crack may correspond to a value about 50% to about 60% of a thickness of the second substrate.

The third crack has a depth corresponding to about 20% to about 25% of a thickness of the first substrate.

A sum of a depth of the third crack and a depth of the fourth crack may correspond to a value equal to or smaller than about 90% of a thickness of the first substrate.

The first substrate and the second substrate may have a same thickness as each other in a range from about 0.2 mm to about 0.25 mm and the first pressure may be in a range from about 0.02 MPa to about 0.03 MPa.

The second pressure may be in a range from about 0.10 MPa to about 0.12 MPa. The cutting of the mother panel may further include disposing the wheel unit at the second cutting lines extending in the second direction, applying a third pressure to the second cutting lines of the second substrate extending in the second direction through the wheel unit to form a fifth crack and a sixth crack, applying the third pressure to the second cutting lines of the first substrate extending in the second direction through the wheel unit to form a seventh crack and an eighth crack, and applying an external force to the first and second substrates to cut the first and second substrates along the second cutting lines extending in the second direction. The third pressure may be greater than the first pressure, and equal to or smaller than a minimum value of the second pressure. The sixth crack may be formed by expanding the fifth crack, and the eighth crack may be formed by expanding the seventh crack.

The first and second substrates may have a same thickness as each other, and the fifth crack and the sixth crack may have a same depth as each other corresponding to about 13% to about 20% of the thickness of the first and second substrates.

A depth of the fifth crack and a depth of the sixth crack may correspond to a value equal to or smaller than about 90% of a thickness of the second substrate, and a sum of a depth of the seventh crack and a depth of the eighth crack may correspond to a value equal to or smaller than about 90% of a thickness of the first second substrate.

The first and second substrates may have a same thickness as each other in a range from about 0.2 mm to about 0.25 mm and the third pressure may be in a range from about 0.06 MPa to about 0.10 MPa.

The cutting of the mother panel may further include disposing the wheel unit at the second cutting lines extending in the first direction, applying the third pressure to the second cutting lines of the second substrate extending in the first direction through the wheel unit to form a ninth crack and a tenth crack, disposing the wheel unit at the third cutting lines extending in the first direction, applying the third pressure to the third cutting lines of the first substrate extending in the first direction through the wheel unit to form an eleventh crack and a twelfth crack, and applying an external force to the first and second substrates to cut the first and second substrates along the second cutting lines and the third cutting lines extending in the first direction. The tenth crack may be formed by expanding the ninth crack, and the twelfth crack may be formed by expanding the eleventh crack.

According to an exemplary embodiment of the present inventive concept, a method of manufacturing a display panel is provided. The method includes preparing a mother panel, disposing a wheel unit on the mother panel, and cutting the mother panel along first to third cutting lines using the wheel unit. The mother panel includes a boundary of the mother panel and a plurality of unit panels within the boundary. Each of the plurality of unit panels includes a first substrate, a second substrate facing the first substrate, a display area, and a sealant disposed between the first and second substrates to couple the first and second substrates. The cutting of the mother panel includes applying a first pressure to the first cutting lines of the second substrate through the wheel unit to form a first crack having a first depth and applying a second pressure to the first cutting lines of the first substrate through the wheel unit to form a second crack having a second depth. The first cutting lines are disposed between the display areas adjacent to each other. The first cutting lines extend in a first direction and a second direction crossing the first direction. The second pressure is greater than the first pressure.

BRIEF DESCRIPTION OF THE DRAWINGS

The above and other aspects of the present inventive concept will become more apparent by describing in detail exemplary embodiments thereof with reference to the accompanying drawings in which.

DETAILED DESCRIPTION OF THE EMBODIMENTS

Like numbers may refer to like elements throughout the specification and drawings. As used herein, the term "and/or" includes any and all combinations of one or more of the associated listed items.

As used herein, the singular forms, "a", "an" and "the" are intended to include the plural forms as well, unless the context clearly indicates otherwise.

Hereinafter, exemplary embodiments of the present inventive concept will be described in more detail with reference to the accompanying drawings.

Figure 1:
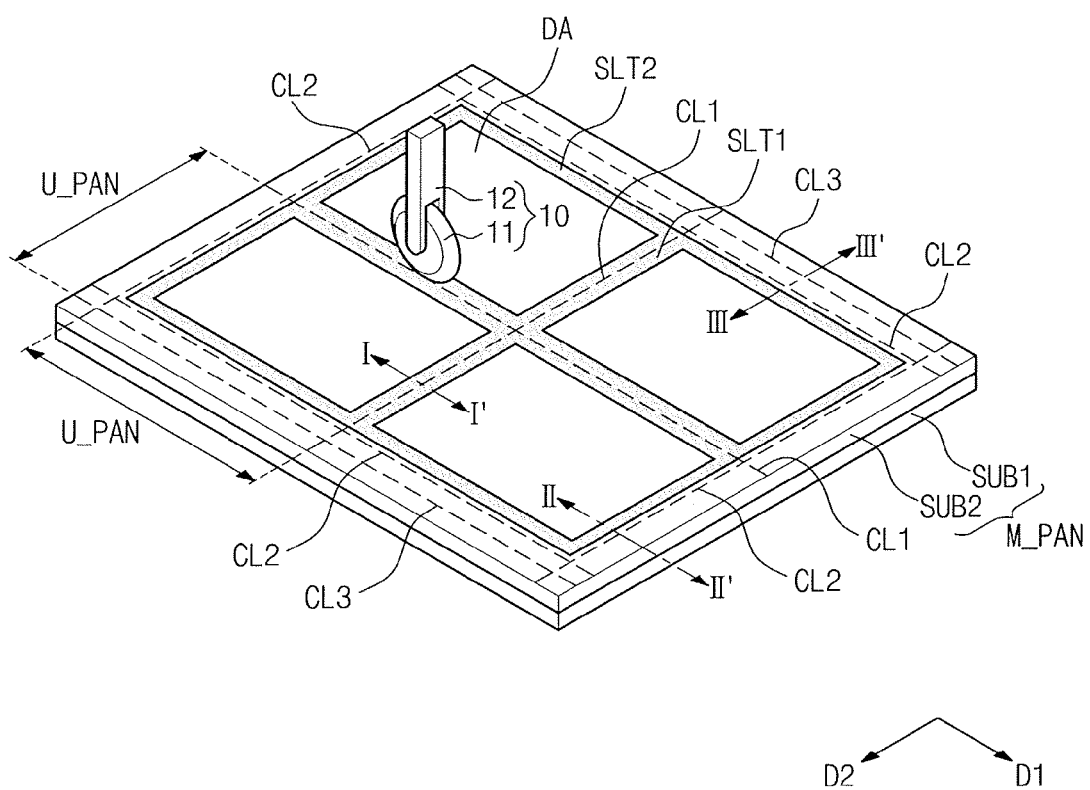
FIG. 1 is a perspective view of a mother panel and a cutting unit for manufacturing a display panel according to an exemplary embodiment of the present inventive concept.

FIG. 1 is a perspective view of a mother panel and a cutting unit for manufacturing a display panel according to an exemplary embodiment of the present inventive concept.

Referring to FIG. 1, a mother panel M_PAN includes a first substrate SUB1, a second substrate SUB2 facing the first substrate SUB1, and an image display layer (not shown) interposed between the first substrate SUB1 and the second substrate SUB2.

The first substrate SUB1 may be a thin film transistor substrate, and the second substrate SUB2 may be a color filter substrate. The first and second substrates SUB1 and SUB2 may be glass substrates. However, the first substrate SUB1 and the second substrate SUB2 are not limited thereto. The image display layer may be a liquid crystal layer, an electrowetting layer, an electrophoretic layer, or the like. Hereinafter, an exemplary embodiment using the liquid crystal layer as the image display layer will be described as the image display layer.

The mother panel M_PAN includes a plurality of unit panels U_PAN. Each of the unit panels U_PAN has long sides in a first direction D1 and short sides in a second direction D2 substantially perpendicular to the first direction D1.

Each unit panel U_PAN includes a display area DA in which a plurality of pixels (not shown) is disposed and sealants SLT1 and SLT2 disposed surrounding the display area DA. Although not shown in figures, the first and second substrates SUB1 and SUB2 are coupled to each other by the sealants SLT1 and SLT2.

The sealants SLT1 and SLT2 include a first sealant SLT1 disposed between the display areas DA adjacent to each other and a second sealant SLT2 disposed surrounding sides of the display area DA adjacent to a boundary of the mother panel M_PAN.

The mother panel M_PAN is cut by a cutting unit 10 along a plurality of cutting lines CL1, CL2, and CL3 extending along boundaries of the unit panels U_PAN. The cutting unit 10 includes a wheel unit 11 and a wheel supporter 12 supporting the wheel unit 11.

The cutting lines CL1, CL2, and CL3 include first cutting lines CL1, second cutting lines CL2, and third cutting lines CL3, which extend along boundaries of the unit panels U_PAN.

The unit panels U_PAN may share boundaries between the display areas DA adjacent to each other. For example, the first cutting lines CL1 extend along a shared boundary between the unit panels U_PAN.

For example, among the first cutting lines CL1, one first cutting line is disposed between two display areas DA adjacent to each other in the first direction D1 and extends in the second direction D2. In addition, among the first cutting lines CL1, one first cutting lien CL1 is disposed between two display areas DA adjacent to each other in the second direction D2 and extends in the first direction D1. Accordingly, the first cutting lines CL1 are disposed at a center position of the first sealant SLT1 and extend in the first and second directions D1 and D2.

The second cutting lines CL2 are disposed adjacent to an outer side of the second sealant SLT2 and extend in the first and second directions D1 and D2. For example, the second cutting lines CL2 are disposed adjacent to the outer side of the second sealant SLT2 in the first direction D1 and extend in the second direction D2. In addition, the second cutting lines CL2 are disposed adjacent to the outer side of the second sealant SLT2 in the second direction D2 and extend in the first direction D1.

The third cutting lines CL3 extend in the first direction D1. The third cutting lines CL3 are disposed to correspond to the second cutting lines CL2 extending in the first direction D1 in a one-to-one correspondence. Each third cutting line CL3 is disposed to be spaced apart from a corresponding one of the second cutting lines CL2 in the second direction D2. The third cutting lines CL3 are disposed at farther positions than the second cutting lines CL2 from the second sealant SLT2.

When the wheel unit 11 supported by the wheel supporter 12 rotates moves along the first, second, and third cutting lines CL1, CL2, and CL3, the mother panel M_PAN is cut along the first, second, and third cutting lines CL1, CL2, and CL3. The cutting processes performed on the mother panel M_PAN along the first, second, and third cutting lines CL1, CL2, and CL3 should not be limited to a specific sequence. Hereinafter, the cutting process performed by using the wheel unit 11 will be described in detail.

Figure 2:
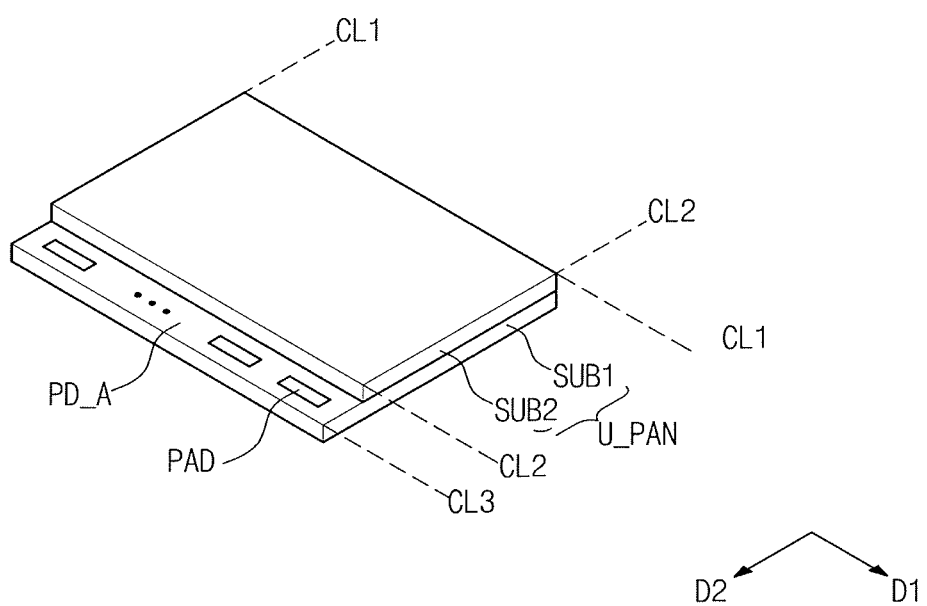
FIG. 2 is a perspective view of a unit panel formed by cutting the mother panel along first, second, and third cutting lines shown in FIG. 2 according to an exemplary embodiment of the present inventive concept.

FIG. 2 is a perspective view of a unit panel formed by cutting the mother panel along first, second, and third cutting lines shown in FIG. 2 according to an exemplary embodiment of the present inventive concept.

For convenience of description, FIG. 2 illustrates a unit panel U_PAN disposed in a second row and a second column among the unit panels U_PAN shown in FIG. 1.

Referring to FIG. 2, the unit panel U_PAN includes the first substrate SUB1, the second substrate SUB2 facing the first substrate SUB1, and the liquid crystal layer (not shown) disposed between the first substrate SUB1 and the second substrate SUB2.

The long sides of the unit panel U_PAN are formed by cutting the mother panel M_PAN along the first, second, and third cutting lines CL1, CL2, and CL3 extending in the first direction D1. The short sides of the unit panel U_PAN are formed by cutting the mother panel M_PAN along the first and second cutting lines CL1 and CL2 extending in the second direction D2.

For example, one long side of the first substrate SUB1 of the unit panel U_PAN is formed by cutting the mother panel M_PAN along the first cutting line CL1 extending in the first direction D1, and another long side of the first substrate SUB1 of the unit panel U_PAN is formed by cutting the mother panel M_PAN along the third cutting line CL3 extending in the first direction D1. In addition, one long side of the second substrate SUB2 of the unit panel U_PAN is formed by cutting the mother panel M_PAN along the first cutting line CL1 extending in the first direction D1, and another long side of the second substrate SUB2 of the unit panel U_PAN is formed by cutting the mother panel M_PAN along the second cutting line CL2 extending in the first direction D1.

An area of the first substrate SUB1, which is disposed between the second and third cutting lines CL2 and CL3 extending in the first direction D1, is referred to as a pad area PD_A. A plurality of pads PAD is disposed in the pad area PD_A of the first substrate SUB1.

The short side of the first and second substrates SUB1 and SUB2 of the unit panel U_PAN is formed by cutting the mother panel M_PAN along the first and second cutting lines CL1 and CL2 extending in the second direction D2.

Hereinafter, the cutting processes of the mother panel M_PAN will be described in detail with reference to FIGS. 3A to 3E. In an exemplary embodiment of the present inventive concept, the mother panel M_PAN is first cut along the first cutting lines CL1, and then cut along the second and third cutting lines CL2 and CL3.

FIGS. 3A to 3E are views showing a cutting method of a mother panel along a first cutting line when viewed in a cross-section taken along a line I-I' shown in FIG. 1 according to an exemplary embodiment of the present inventive concept.

Figure 3A:
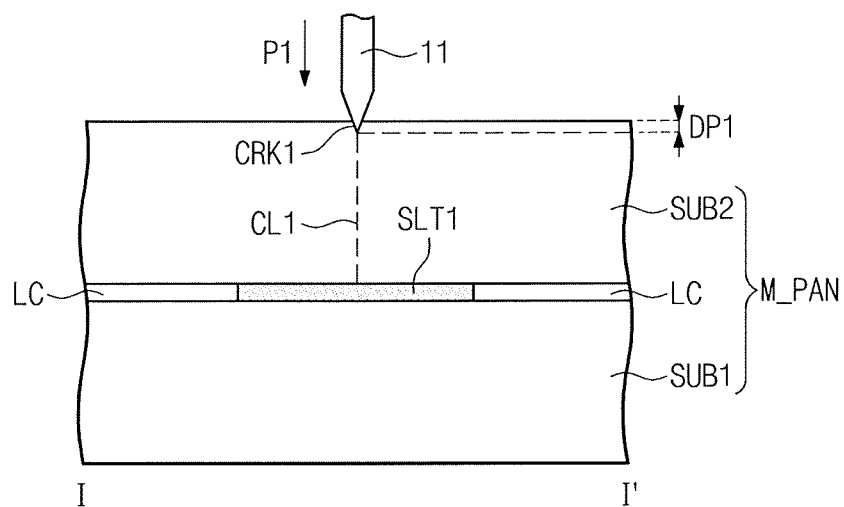
FIGS. 3A to 3E are views showing a cutting method of a mother panel along a first cutting line when viewed in a cross-section taken along a line I-I' shown in FIG. 1 according to an exemplary embodiment of the present inventive concept.

Referring to FIG. 3A, the first cutting line CL1 is disposed to overlap the center position of the first sealant SLT1. For example, the first sealant SLT1 is disposed between the first substrate SUB1 and the second substrate SUB2 in the area in which the first cutting line CL1 is disposed. The liquid crystal layer LC is disposed between the first substrate SUB1 and the second substrate SUB2 in the area in which the first sealant SLT1 is not disposed.

The wheel unit 11 is disposed at the first cutting line CL1 of the second substrate SUB2 of the mother panel M_PAN. The wheel unit 11 is disposed on the second substrate SUB2.

The wheel unit 11 contacts the first cutting line CL1 of the second substrate SUB2 and rotates while moving along the first cutting line CL1. The wheel unit 11 applies a first pressure P1 to the first cutting line CL1 of the second substrate SUB2 when moving along the first cutting line CL1 to form a first crack CRK1 on the first cutting line CL1 of the second substrate SUB2.

For example, the first crack CRK1 is formed by the first pressure P1 applied to the first cutting line CL1 of the second substrate SUB2 from the wheel unit 11 when the wheel unit 11 contacts the first cutting line CL1 of the second substrate SUB2. The first crack CRK1 may be a recess recessed downward from an upper surface of the second substrate SUB2 along the first cutting line CL1, which is formed by the first pressure P1 from the wheel unit 11.

The first crack CRK1 has a first depth DP1. The first crack CRK1 having the first depth DP1 is formed downward from the upper surface of the second substrate SUB2 by the wheel unit 11. The first depth DP1 corresponds to about 5% to about 8% of a thickness of the second substrate SUB2 according to the first pressure P1.

In an exemplary embodiment of the present inventive concept, the first and the second substrates SUB1 and SUB2 have substantially the same thickness as each other in a range from about 0.2 mm to about 0.25 mm. In this case, the wheel unit 11 applies the first pressure P1 of about 0.02 MPa to about 0.03 MPa to the first cutting line CL1 of the second substrate SUB2, and thus the first crack CRK1 is formed to have the first depth DP1.

Figure 3B:
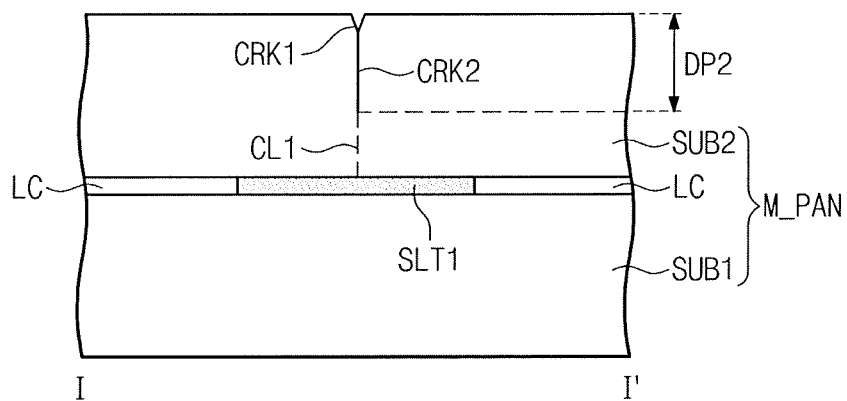

Referring to FIG. 3B, since the first crack CRK1 is formed by the first pressure P1 applied to the first cutting line CL1 of the second substrate SUB2 from the wheel unit 11, the first crack CRK1 has a shape corresponding to an end shape of the wheel unit 11.

Since the wheel unit 11 rotates and moves along the first cutting line CL1, the wheel unit 11 is not shown in FIG. 3B. The first crack CRK1 is formed in the second substrate SUB2 by the first pressure P1 applied from the wheel unit 11. In addition, a crack of the first crack CRK1 is substantially expanded by the first pressure P1, and thus a second crack CRK2 is formed in the second substrate SUB2.

A sum of the first depth DP1 of the first crack CRK1 and a depth of the second crack CRK2 is referred to as a second depth DP2. For example, a crack having the second depth DP2 is formed downward from the upper surface of the second substrate SUB2 by the first and second cracks CRK1 and CRK2.

When the first depth DP1 corresponds to about 5% to about 8% of the thickness of the second substrate SUB2, the second depth DP2 corresponds to about 50% to about 60% of the thickness of the second substrate SUB2. For example, the second depth DP2, which corresponds to about 50% to about 60% of the thickness of the second substrate SUB2, is determined by the first pressure P1 from the wheel unit 11.

Figure 3C:
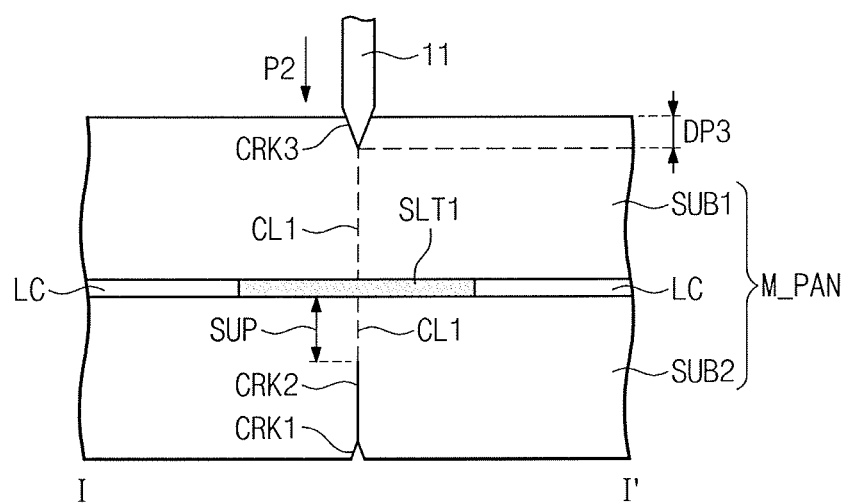

Referring to FIG. 3C, the wheel unit 11 is disposed on the first cutting line CL1 of the first substrate SUB1 of the mother panel M_PAN. The wheel unit 11 is disposed on the first substrate SUB1. Although not shown in figures, the wheel unit 11 may be disposed on the first substrate SUB1 after the mother panel M_PAN turns over.

The wheel unit 11 contacts the first cutting line CL1 of the first substrate SUB1 and rotates while moving along the first cutting line CL1. The wheel unit 11 applies a second pressure P2 to the first cutting line CL1 of the first substrate SUB1 when moving along the first cutting line CL1 to form a third crack CRK3 on the first cutting line CL1 of the first substrate SUB1. The second pressure P2 is greater than the first pressure P1.

The third crack CRK3 has a third depth DP3. The third crack CRK3 having the third depth DP3 is formed downward from the upper surface of the first substrate SUB1 by the second pressure P2 applied from the wheel unit 11. The third depth DP3 is greater than the first depth DP1. The third depth DP3 corresponds to about 20% to about 25% of a thickness of the first substrate SUB1 according to the second pressure P2.

In an exemplary embodiment of the present inventive concept, the first and second substrates SUB1 and SUB2 have substantially the same thickness as each other in the range from about 0.2 mm to about 0.25 mm. In this case, the wheel unit 11 applies the second pressure P2 of about 0.10 MPa to about 0.12 MPa to the first cutting line CL1 of the first substrate SUB1, and thus the third crack CRK3 is formed to have the third depth DP3.

Figure 3D:
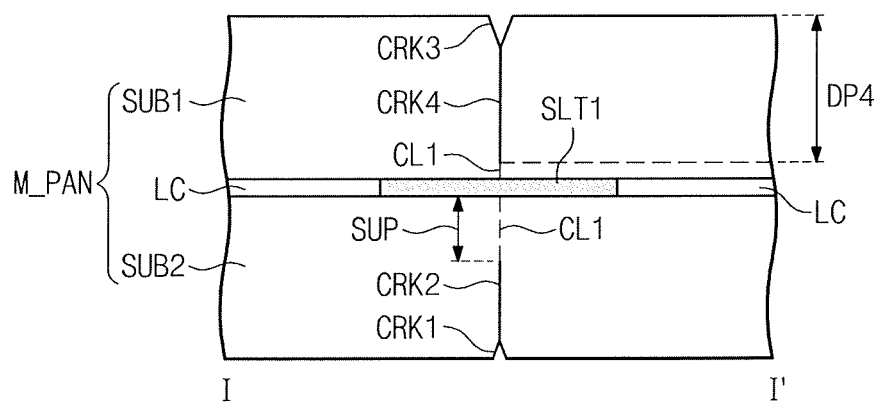

Referring to FIG. 3D, the third crack CRK3 has a shape corresponding to an end shape of the wheel unit 11. Since the wheel unit 11 rotates and moves along the first cutting line CL1, the wheel unit 11 is not shown in FIG. 3D. The third crack CRK3 is formed by the second pressure P2 from the wheel unit 11. A crack of the third crack CRK3 is substantially expanded by the second pressure P2 from the wheel unit 11, and thus a fourth crack CRK4 is formed in the first substrate SUB1.

A sum of the third depth DP3 of the third crack CRK3 and a depth of the fourth crack CRK4 is referred to as a fourth depth DP4. For example, a crack having the fourth depth DP4 is formed downward from the upper surface of the first substrate SUB by the third and fourth cracks CRK3 and CRK4.

When the third depth DP3 corresponds to about 20% to about 25% of the thickness of the first substrate SUB1, the fourth depth DP4 may be equal to or greater than about 90% of the thickness of the first substrate SUB1. For example, the fourth depth DP4, which corresponds to about 90% of the thickness of the first substrate SUB1, is determined by the second pressure P2 provided from the wheel unit 11.

Hereinafter, the second substrate includes a supporter SUP corresponding to an area in which no crack is formed when the third crack CRK3 is formed. The supporter SUP has a thickness corresponding to about 40% to about 50% of the thickness of the second substrate SUB2.

The first sealant SLT1 is disposed in the area in which the first cutting line CL1 is disposed. When the supporter SUP does not have a predetermined thickness in the area in which the first sealant SLT1 is disposed, the crack might not be formed in a normal shape along the first cutting line CL1. For example, when the thickness of the supporter SUP is thinner than the predetermined thickness, the wheel unit 11 may be separated from the first cutting line CL1 without moving along the first cutting line CL1.

For example, when the first pressure P1 generated by the wheel unit 11 is equal to the second pressure P2 generated by the wheel unit 11 and the second depth DP2 formed by the first pressure P1 corresponds to about 90% of the thickness of the second substrate SUB2, the supporter SUP has the thickness corresponding to about 10% of the thickness of the second substrate SUB2.

Since the first pressure P1 is equal to the second pressure P2, the fourth depth DP4 may correspond to about 90% of the thickness of the first substrate SUB1 by the second pressure P2 provided from the wheel unit 11. In the case that the supporter SUP has the thickness corresponding to about 10% of the thickness of the second substrate SUB2, the wheel unit 11 may be separated from the first cutting line CL1 when the third crack CRK3 is formed using the wheel unit 11 since the supporting force of the supporter SUP becomes weak.

This may be because a direction to which the wheel unit 11 moves may be distorted by a tensile force generated from the first sealant SLT1 which is formed by curing an organic material. Accordingly, when the third crack CRK3 is not formed in a normal shape along the first cutting line CL1, the unit panel U_PAN might not have a normal shape, (e.g., a desired shape).

To prevent the above-mentioned phenomenon from occurring, the supporter SUP has the predetermined thickness. Therefore, the supporter SUP does not receive the influence of the tensile force generated from the first sealant SLT1, and thus the supporting force of the supporter SUP may be increased.

According to an exemplary embodiment of the present inventive concept, when the first pressure P1 is smaller than the second pressure P2 and the second depth DP2 defined by the first and second cracks CRK1 and CRK2 is reduced, the thickness of the supporter SUP becomes larger.

As described above, in the case that the supporter SUP has the thickness corresponding to about 40% to about 50% of the thickness of the second substrate SUB2, the wheel unit 11 may move along the first cutting line CL1 when the third crack CRK3 is formed by the second pressure P2 greater than the first pressure P1.

Accordingly, the crack may be formed to the fourth depth DP4 by the third and fourth cracks CRK3 and CRK4 along the first cutting line CL1 of the first substrate SUB1. Thus, the first to fourth cracks CRK1 to CRK4 may be formed along the first cutting line CL1.

Figure 3E:
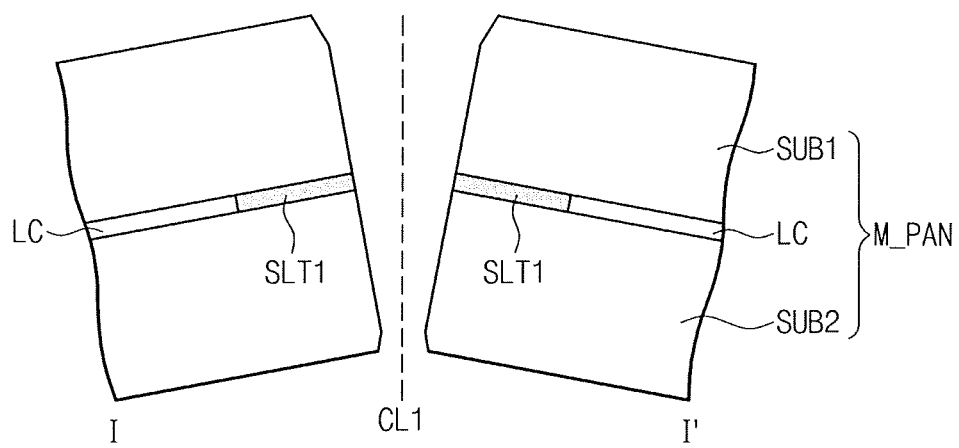

Referring to FIG. 3E, when the first to fourth cracks CRK1 to CRK4 are formed and an external force is applied to the mother panel M_PAN, the first and second substrates SUB1 and SUB2 of the mother panel M_PAN are cut along the first cutting line CL1.

As an exemplary embodiment of the present inventive concept, the cutting method of the mother panel M_PAN along the first cutting line CL1 extending in the second direction D2 has been described, but the mother panel M_PAN may be cut along the first cutting line CL1 extending in the first direction D1 based on substantially the same methods described with reference to FIGS. 3A to 3E.

In addition, the first and second cracks CRK1 and CRK2 are formed in the second substrate SUB2 by the wheel unit 11, and the third and fourth cracks CRK3 and CRK4 are formed in the first substrate SUB1 by the wheel unit 11, but the present inventive concept is not limited thereto. For example, the first and second cracks CRK1 and CRK2 may be formed in the first substrate SUB1 by the wheel unit 11, and the third and fourth cracks CRK3 and CRK4 may be formed in the second substrate SUB2 by the wheel unit 11. As described above, the first to fourth cracks CRK1 to CRK4 may be formed along the first cutting lines CL1, and thus the mother panel M_PAN may be normally cut along the first cutting lines CL1.

FIGS. 4A to 4E are views showing a cutting method of a mother panel along a second cutting line when viewed in a cross-section taken along a line II-II' shown in FIG. 1 according to an exemplary embodiment of the present inventive concept.

The second cutting line CL2 shown in FIGS. 4A to 4E corresponds to one of the second cutting lines CL2 extending in the second direction D2. The mother panel M_PAN may be cut along the second cutting lines CL2 extending in the second direction D2 shown in FIG. 1 by the following cutting method.

Figure 4A:
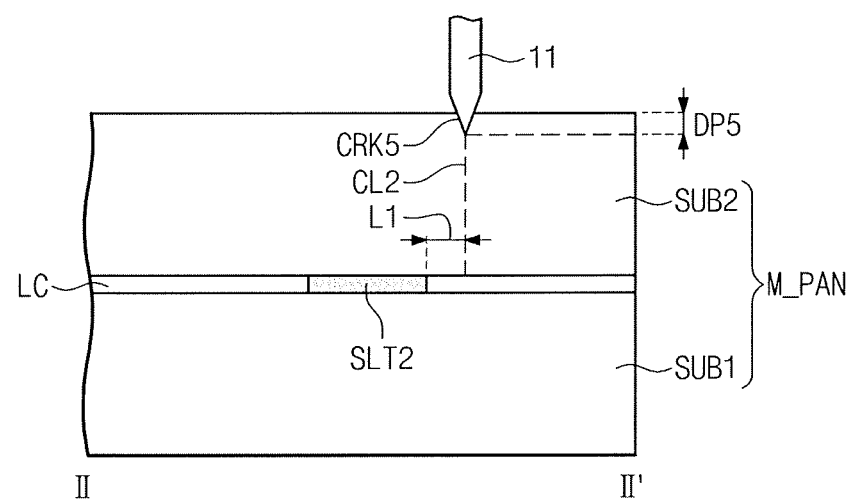
FIGS. 4A to 4E are views showing a cutting method of a mother panel along a second cutting line when viewed in a cross-section taken along a line II-II' shown in FIG. 1 according to an exemplary embodiment of the present inventive concept.

Referring to FIG. 4A, the second cutting line CL2 is disposed at a position spaced apart from the second sealant SLT2 to be in the area in which the liquid crystal layer LC is not disposed. For example, the second cutting line CL2 is spaced apart from an outer side of the second sealant SLT2 by a first distance L1 to secure a process margin. The second sealant SLT2 is not disposed in the area in which the second cutting line CL2 is disposed. For example, the second sealant SLT2 might not overlap the second cutting line CL2. In an exemplary embodiment of the present inventive concept, the first distance L1 is set to about 0.3 mm, but the first distance L1 is not limited thereto.

The liquid crystal layer LC disposed between the first substrate SUB1 and the second substrate SUB2 is disposed adjacent to an inner side of the second sealant SLT2. The wheel unit 11 is disposed on the second cutting line CL2 of the second substrate SUB2 of the mother panel M_PAN.

The wheel unit 11 contacts the second cutting line CL2 of the second substrate SUB2 and rotates while moving along the second cutting line CL2. The wheel unit 11 applies a third pressure P3 to the second cutting line CL2 of the second substrate SUB2 when moving along the second cutting line CL2 to form a fifth crack CRK5 on the second cutting line CL2 of the second substrate SUB2. The third pressure P3 is greater than the first pressure P1 (e.g., 0.02 MPa to 0.03 MPa) and equal to or smaller than a minimum value (e.g., 0.1 MPa) of the second pressure P2 (e.g., 0.1 MPa to 0.12 MPa).

The fifth crack CRK5 has a fifth depth DP5. The fifth crack CRK5 having the fifth depth DP5 is formed downward from the upper surface of the second substrate SUB2 by the third pressure P3 provided from the wheel unit 11. The fifth depth DP5 formed by the third pressure P3 may correspond to about 13% to about 20% of the thickness of the second substrate SUB2. The fifth depth DP5 is greater than the first depth DP1 and equal to or smaller than a minimum value of the third depth DP3. For example, the minimum value of the third depth DP3 may correspond to a depth value formed by the minimum value (e.g., 0.1 MPa) of the second pressure P2.

In an exemplary embodiment of the present inventive concept, the first and second substrates SUB1 and SUB2 have substantially the same thickness as each other in the range from about 0.2 mm to about 0.25 mm. In this case, the wheel unit 11 applies the third pressure P3 of about 0.06 MPa to about 0.10 MPa to the second cutting line CL2 of the second substrate SUB2, and thus the fifth crack CRK5 is formed to have the fifth depth DP5.

Figure 4B:
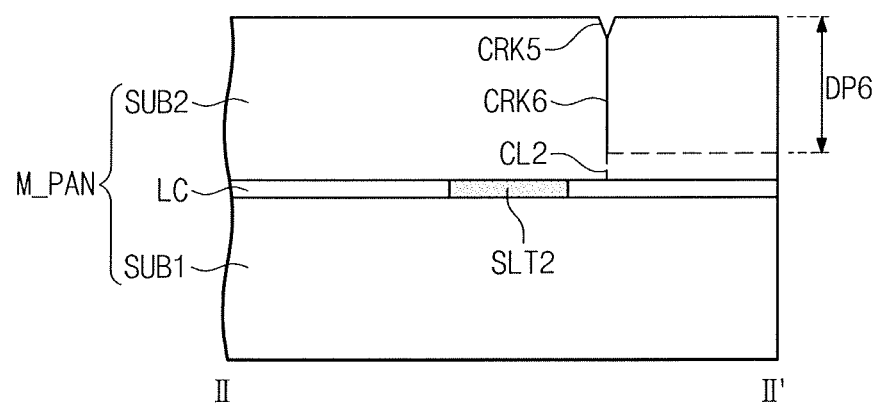

Referring to FIG. 4B, since the wheel unit 11 rotates and moves along the second cutting line CL2, the wheel unit 11 is not shown in FIG. 4B. The fifth crack CRK5 is formed in the second substrate SUB2 by the third pressure P3 applied from the wheel unit 11. In addition, a crack of the fifth crack CRK5 is substantially expanded by the third pressure P3, and thus a sixth crack CRK6 is formed in the second substrate SUB2.

A sum of the fifth depth DP5 of the fifth crack CRK5 and a depth of the sixth crack CRK6 is referred to as a sixth depth DP6. For example, a crack having the sixth depth DP6 is formed downward from the upper surface of the second substrate SUB2 by the fifth and sixth cracks CRK5 and CRK6. The sixth depth DP6 is greater than the second depth DP2, and equal to or smaller than the fourth depth DP4.

When the fifth depth DP5 corresponds to about 13% to about 20% of the thickness of the second substrate SUB2, the sixth depth DP6 corresponds to about 90% of the thickness of the second substrate SUB2 or less. For example, the sixth depth DP6, which corresponds to about 90% of the thickness of the second substrate SUB2 or less, is determined by the third pressure P3 provided from the wheel unit 11.

Figure 4C:
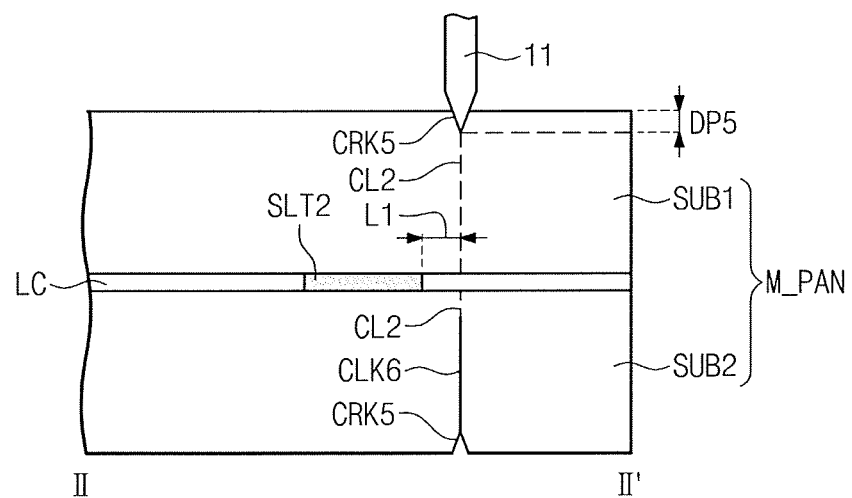
Figure 4D:
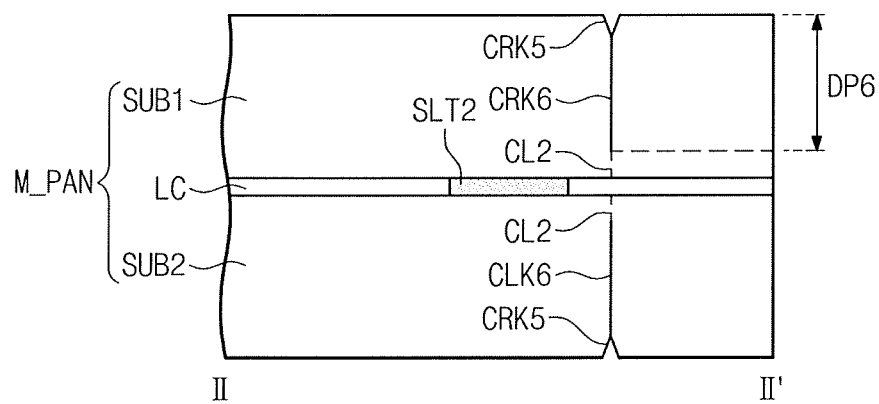

Referring to FIGS. 4C and 4D, the wheel unit 11 is disposed on the second cutting line CL2 of the first substrate SUB1 of the mother panel M_PAN after the mother panel M_PAN turns over.

The method of forming the crack on the first substrate SUB1 of the mother panel M_PAN along the second cutting line CL2 by the wheel unit 11 is substantially the same as the method of cutting the second substrate SUB2 of the mother panel M_PAN along the second cutting line CL2. Accordingly, for convenience of description, the same cracks and the same depths will be assigned with the same reference numerals.

To cut the first substrate SUB1 along the second cutting line CL2, the wheel unit 11 applies the third pressure P3 to the second cutting line CL2 of the first substrate SUB1 when moving along the second cutting line CL2 of the first substrate SUB1, and thus a fifth crack CRK5 is formed on the second cutting line CL2 of the first substrate SUB1. Therefore, a crack having the fifth depth DP5 is formed downward from the upper surface of the first substrate SUB1. The fifth depth DP5 of the fifth crack CRK5 formed by the third pressure P3 corresponds to about 13% to about 20% of the thickness of the first substrate SUB1.

In addition, the fifth crack CRK5 is formed in the first substrate SUB1 by the third pressure P3 from the wheel unit 11. A crack of the fifth crack CRK5 is substantially expanded by the third pressure P3 from the wheel unit 11, and thus a sixth crack CRK6 is formed in the first substrate SUB1. For example, a crack having the six depth DP6 is formed downward from the upper surface of the first substrate SUB1. The sixth depth DP6 is equal to or smaller than about 90% of the thickness of the first substrate SUB1.

Figure 4E:
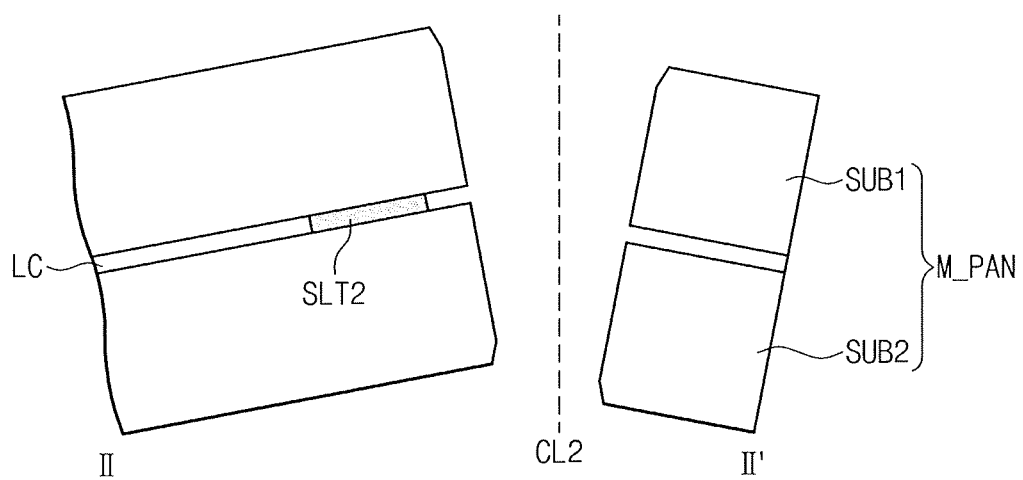

Referring to FIG. 4E, when the fifth and sixth cracks CRK5 and CRK6 are formed and an external force is applied to the mother panel M_PAN, the first and second substrates SUB1 and SUB2 of the mother panel M_PAN are cut along the second cutting line CL2.

The second sealant SLT2 is not disposed in the area in which the second cutting line CL2 is disposed. In this case, the first and second substrates SUB1 and SUB2 may be cut along the second cutting line CL2 by applying the same third pressure P3 to the first and second substrates SUB1 and SUB2 and forming the fifth and sixth cracks CRK5 and CRK6.

Figure 5A:
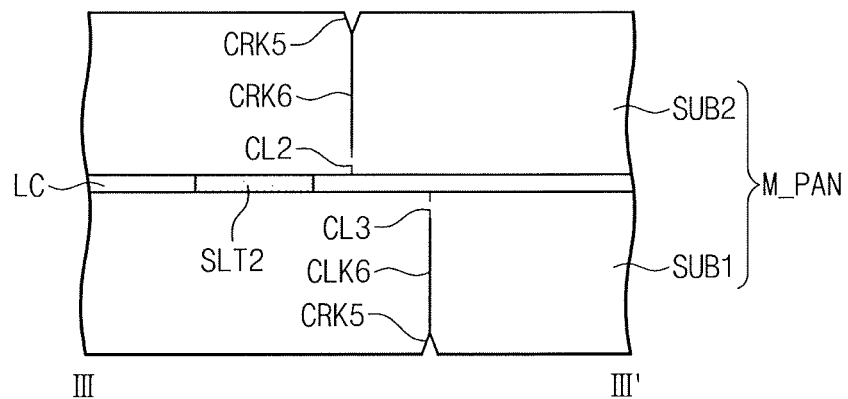
FIGS. 5A and 5B are views showing a cutting method of a mother panel along second and third cutting lines when viewed in a cross-section taken along a line III-III' shown in FIG. 1 according to an exemplary embodiment of the present inventive concept.
Figure 5B:
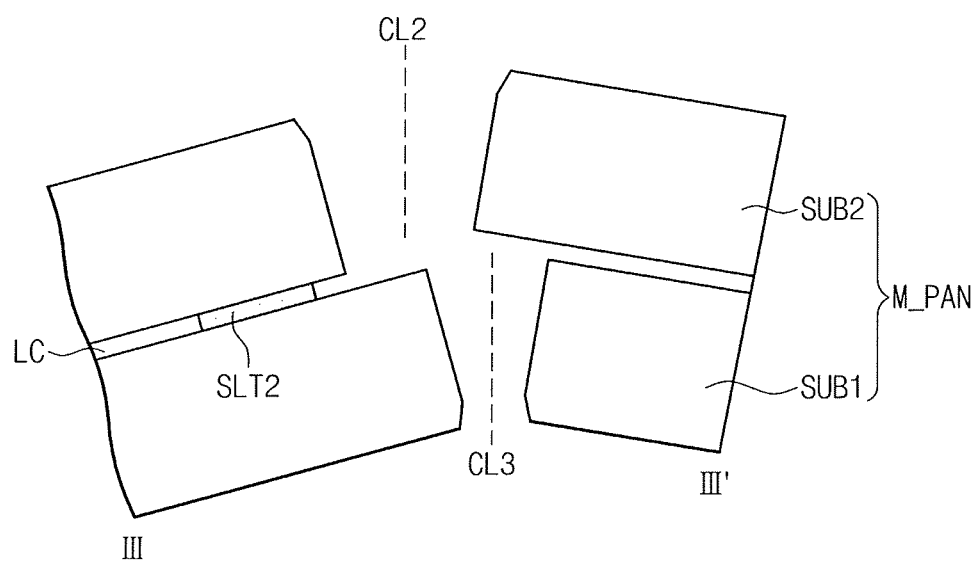

FIGS. 5A and 5B are views showing a cutting method of a mother panel along second and third cutting lines when viewed in a cross-section taken along a line shown in FIG. 1 according to an exemplary embodiment of the present inventive concept.

FIGS. 5A and 5B show one second cutting line CL2 and one third cutting line CL3, however, the mother panel M_PAN may be cut along the second cutting lines CL2 and the third cutting lines CL3, which extend in the first direction D1 shown in FIG. 1.

Referring to FIG. 5A, the method of forming the crack on the second substrate SUB2 of the mother panel M_PAN along the second cutting line CL2 by the wheel unit 11 is substantially the same as the method described with reference to FIGS. 4A and 4B.

In addition, the method of forming the crack on the first substrate SUB1 of the mother panel M_PAN along the third cutting line CL3 by the wheel unit 11 is substantially the same as the method described with reference to FIGS. 4C and 4D except for the position at which the crack on the first substrate SUB1 is formed. Thus, for convenience of description, the same crack and the same depth will be assigned with the same reference numerals.

Hereinafter, the method of cutting the first and second substrates SUB1 and SUB2 along the second and third cutting lines CL2 and CL3 will be described.

The wheel unit 11 is disposed at the second cutting line CL2 of the second substrate SUB2 and applies the third pressure P3 to the second cutting line CL2 of the second substrate SUB2 when moving along the second cutting line CL2. In addition, the wheel unit 11 is disposed at the third cutting line CL3 of the first substrate SUB1 and applies the third pressure P3 to the third cutting line CL3 of the first substrate SUB1 when moving along the third cutting line CL3.

Accordingly, the fifth crack CRK5 and the sixth crack CRK6 are formed along the second cutting line CL2 of the second substrate SUB2 and the third cutting line CL3 of the first substrate SUB1. Referring to FIG. 5B, when the fifth and sixth cracks CRK5 and CRK6 are formed and an external force is applied to the mother panel M_PAN, the first and second substrates SUB1 and SUB2 of the mother panel M_PAN are cut along the third and second cutting lines CL3 and CL2.

Therefore, the unit panel U_PAN shown in FIG. 2 is formed by the cutting method of the mother panel M_PAN according to the exemplary embodiment of the present inventive concept.

According to the exemplary embodiment of the present inventive concept, the first to fourth cracks CRK1 to CRK4 may be normally formed in the area in which the first sealant SLT1 is disposed along the first cutting lines CL1. Accordingly, the mother panel M_PAN is cut along the first cutting lines CL1, and thus the unit panel U_PAN having a normal shape may be formed. The unit panel U_PAN is used as a display panel of the display device.

Thus, a display panel having a normal shape may be formed using the above-mentioned manufacturing method of the display panel according to the exemplary embodiment of the present inventive concept.

Figure 6:
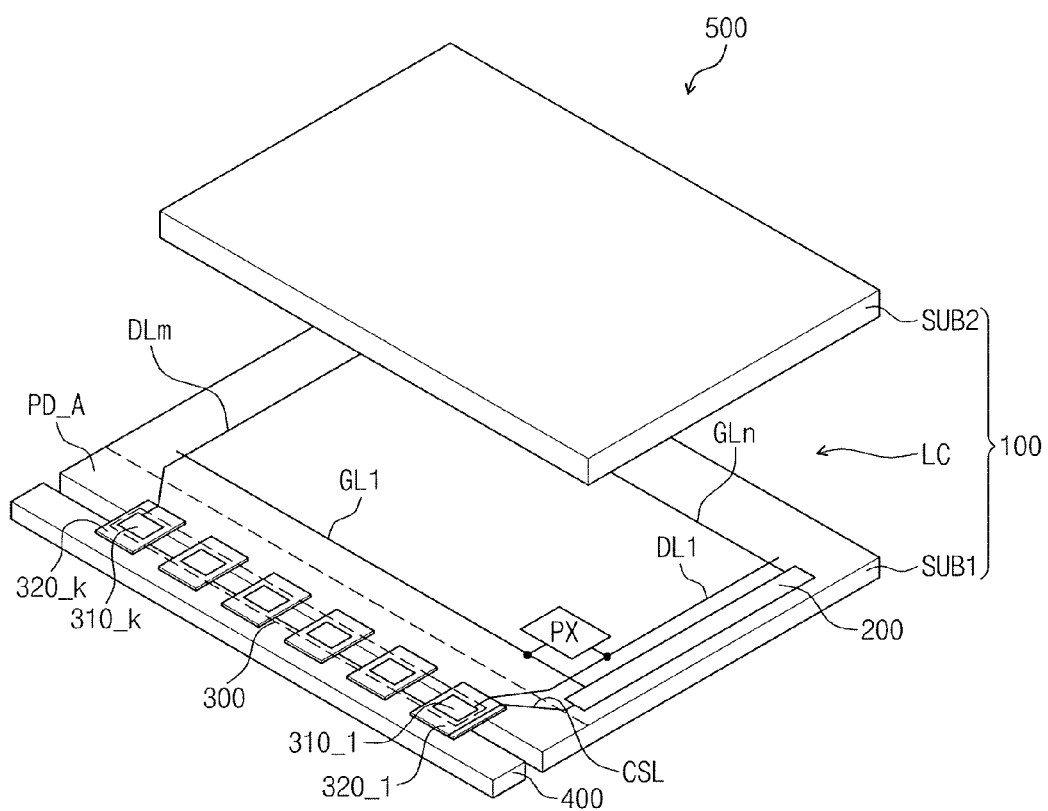
FIG. 6 is an exploded perspective view of a display device manufactured using the display panel shown in FIG. 2 according to an exemplary embodiment of the present inventive concept.

FIG. 6 is an exploded perspective view of a display device 500 manufactured using the display panel shown in FIG. 2 according to an exemplary embodiment of the present inventive concept.

The display panel 100 shown in FIG. 6 may correspond to the unit panel U_PAN shown in FIG. 2.

Referring to FIG. 6, the display device 500 includes the display panel 100, a gate driver 200, a data driver 300, and a driving circuit board 400. The display panel 100 includes the first substrate SUB1 on which the pixels PX are arranged, the second substrate SUB2 disposed to face the first substrate SUB1, and the liquid crystal layer LC interposed between the first substrate SUB1 and the second substrate SUB2.

The data driver 300 connected to the driving circuit board 400 is connected to pads arranged in the pad area PD_A of the first substrate SUB1. Although not shown in FIG. 6, the first substrate SUB1 and the second substrate SUB2 of the display panel 100 are coupled to each other by the first and second sealants SLT1 and SLT2.

The first substrate SUB1 includes the pixels PX, gate lines GL1 to GLn, and data lines DL1 to DLm, which are disposed thereon. FIG. 6 shows only one pixel PX, but the pixels PX are arranged on the first substrate SUB1 in a matrix form.

The gate lines GL1 to GLn and the data lines DL1 to DLm extend to cross each other. Each of the pixels PX is connected to a corresponding gate line of the gate lines GL1 to GLn and a corresponding data line of the data lines DL1 to DLm.

The gate lines GL1 to GLn are connected to the gate driver 200 and the data lines DL1 to DLm are connected to the data driver 300.

A control signal line part CSL receives a gate control signal from a timing controller (not shown) mounted on the driving circuit board 400. The control signal line part CSL is connected to the gate driver 200 through a flexible printed circuit board 320_1 disposed at one outermost position to apply the gate control signal to the gate driver 200.

The gate driver 200 generates gate signals in response to the gate control signal. The gate signals are sequentially applied to the pixels PX through the gate lines GL1 to GLn in the unit of row, and thus the pixels PX are driven in the unit of row.

The data driver 300 receives image signals and a data control signal from the timing controller. The data driver 300 generates analog data voltages corresponding to the image signals in response to the data control signal. The data driver 300 applies the data voltages to the pixels PX through the data lines DL1 to DLm.

The data driver 300 includes a plurality of source driving chips 310_1 to 310_k. In an exemplary embodiment of the present inventive concept, "k" is an integer number greater than zero (0) and smaller than "m". Although not shown in figures, the source driving chips 310_1 to 310_k are mounted on flexible printed circuit boards 320_1 to 320_k, respectively, to connect the driving circuit board 400 and the pads.

For example, the data driver 300 is connected to the display panel 100 by a tape carrier package (TCP) scheme, but it is not limited thereto. The source driving chips 310_1 to 310_k may be mounted in the pad area PD_A by a chip on glass (COG) scheme.

Although not shown in figures, the second substrate SUB2 includes the common electrode disposed to face pixel electrodes of the pixel PX and the color filters disposed to correspond to the pixels PX. Each color filter includes a color pixel to display one of red, green, and blue colors.

Each pixel PX may include a thin film transistor that receives the data voltage through the corresponding data line in response to the gate signal provided through the corresponding gate line. The data voltage is applied to the pixel electrode and the common voltage is applied to the common electrode. Due to a difference in voltage between the data voltage and the common voltage, an electric field is formed between the pixel electrode and the common electrode.

The liquid crystal layer LC is driven by the electric field formed between the pixel electrode and the common electrode; and an alignment of liquid crystal molecules of the liquid crystal layer LC is changed by the electric field driven to the liquid crystal layer LC. A transmittance of light passing through the liquid crystal layer LC is changed according to the alignment of the liquid crystal molecules, and thus a desired image is displayed through the display panel 100.

Although the present inventive concept has been described with reference to exemplary embodiments thereof, it will be understood that the present inventive concept is not limited to the disclosed embodiments and various changes in forms and details may be made therein without departing from the spirit and scope of the present inventive concept.

What is claimed is:

1. A method of manufacturing a display panel, comprising:
    preparing a mother panel including a boundary of the mother panel and a plurality of unit panels within the boundary, wherein each of the plurality of unit panels includes a first substrate, a second substrate facing the first substrate, a display area, and a sealant disposed between the first and second substrates to couple the first and second substrates and being disposed surrounding the display area;
    disposing a wheel unit on the mother panel; and
    cutting the mother panel along a plurality of cutting lines using the wheel unit,
    wherein the wheel unit applies a first pressure to a portion of the second substrate to cut the second substrate when the mother panel is cut to form a first crack having a first thickness in the second substrate, and forming a supporter having a second thickness that is substantially equal to or less than the first thickness in the second substrate,
    wherein, after forming the first crack, the wheel unit applies a second pressure different from the first pressure to a portion of the first substrate to cut the first substrate when the mother panel is cut to form a second crack having a third thickness in the first substrate, wherein the third thickness is greater than the first thickness, and
    wherein the first crack, the supporter and the second crack are substantially aligned along a cutting line of the plurality of cutting lines.

2. The method of claim 1, wherein the sealant comprises:
    a first sealant disposed between display areas adjacent to each other among the display areas of the plurality of unit panels; and
    a second sealant disposed surrounding sides of the display area facing the boundary of the mother panel, and each of the plurality of unit panels comprises long sides in a first direction and short sides in a second direction crossing the first direction.

3. The method of claim 2, wherein the plurality of cutting lines comprises:
    first cutting lines disposed between the display areas adjacent to each other and extending in the first and second directions;
    second cutting lines disposed adjacent to an outer side of the second sealant and extending in the first and second directions; and
    third cutting lines spaced apart from the second cutting lines by a predetermined distance in the second direction and extending in the first direction,
    wherein the third cutting lines are disposed to correspond to the second cutting lines in a one-to-one correspondence and are disposed at farther positions than the second cutting lines from the second sealant.

4. The method of claim 3, wherein the second cutting lines are spaced apart from the outer side of the second sealant by a first distance.

5. The method of claim 4, wherein the first distance is about 0.3 mm.

6. The method of claim 3, wherein the cutting of the mother panel comprises:
    disposing the wheel unit at the first cutting lines;
    applying the first pressure to the first cutting lines of the second substrate through the wheel unit to form the first crack by forming a first initial crack by applying the first pressure and expanding the first initial crack to form a third crack, wherein the first initial crack and the third crack are combined to form the first crack
    applying the second pressure to the first cutting lines of the first substrate through the wheel unit to form the second crack by forming a second initial crack by applying the second pressure and expanding the second initial crack to form a fourth crack, wherein the second initial crack and the fourth crack are combined to form the second crack; and
    applying an external force to the first and second substrate to cut the first and second substrates along the first cutting lines.

7. The method of claim 6, wherein the second initial crack has a thickness greater than a thickness of the first initial crack.

8. The method of claim 1, wherein the first crack has a thickness of about 50% to about 60% of a thickness of the second substrate, wherein the supporter has a thickness of about 40% to about 50% of the thickness of the second substrate, and wherein the second crack has a thickness of about 90% of a thickness of the first substrate.

9. The method of claim 6, wherein the first crack has a thickness of about 50% to about 60% of a thickness of the second substrate.

10. The method of claim 6, wherein the second crack has a thickness of about 90% of a thickness of the first substrate.

11. The method of claim 6, wherein the first substrate and the second substrate have a same thickness as each other in a range from about 0.2 mm to about 0.25 mm and the first pressure is in a range from about 0.02 MPa to about 0.03 MPa.

12. The method of claim 11, wherein the second pressure is in a range from about 0.10 MPa to about 0.12 MPa.

13. The method of claim 6, wherein the cutting of the mother panel further comprises:
disposing the wheel unit at the second cutting lines extending in the second direction;
applying a third pressure to the second cutting lines of the second substrate extending in the second direction through the wheel unit to form a fifth crack and a sixth crack, the sixth crack being formed by expanding the fifth crack;
applying the third pressure to the second cutting lines of the first substrate extending in the second direction through the wheel unit to form a seventh crack and an eighth crack, the eighth crack being formed by expanding the fifth crack; and
applying an external force to the first and second substrates to cut the first and second substrates along the second cutting lines extending in the second direction, and the third pressure is greater than the first pressure, and equal to or smaller than a minimum value of the second pressure.

14. The method of claim 13, wherein the first and second substrates have a same thickness as each other, and the fifth crack and the sixth crack has a same depth as each other corresponding to about 13% to about 20% of the thickness of the first and second substrates.

15. The method of claim 13, wherein a sum of a depth of the fifth crack and a depth of the sixth crack corresponds to a value equal to or smaller than about 90% of a thickness of the second substrate, and a sum of a depth of the seventh crack and a depth of the eighth crack corresponds to a value equal to or smaller than about 90% of a thickness of the first substrate.

16. The method of claim 15, wherein the first and second substrates have a same thickness as each other in a range from about 0.2 mm to about 0.25 mm and the third pressure is in a range from about 0.06 MPa to about 0.10 MPa.

17. The method of claim 13, wherein the cutting of the mother panel further comprises:
disposing the wheel unit at the second cutting lines extending in the first direction;
applying the third pressure to the second cutting lines of the second substrate extending in the first direction through the wheel unit to form a ninth crack and a tenth crack, the tenth crack being formed by expanding the ninth crack; disposing the wheel unit at the third cutting lines extending in the first direction;
applying the third pressure to the third cutting lines of the first substrate extending in the first direction through the wheel unit to form an eleventh crack and a twelfth crack, the twelfth being formed by expanding the eleventh crack; and
applying an external force to the first and second substrates to cut the first and second substrates along the second cutting lines and the third cutting lines extending in the first direction.

18. A method of manufacturing a display panel, comprising:
preparing a mother panel including a boundary of the mother panel and a plurality of unit panels within the boundary, wherein each of the plurality of unit panels includes a first substrate, a second substrate facing the first substrate, a display area, and a sealant disposed between the first and second substrates to couple the first and second substrates;
disposing a wheel unit on the mother panel; and
cutting the mother panel along first to third cutting lines using the wheel unit,
wherein the cutting of the mother panel includes:
applying a first pressure to the first cutting lines of the second substrate through the wheel unit to form a first crack having a first thickness, and forming a supporter having a second thickness that is substantially equal to or less than the first thickness in the second substrate; and
after forming the first crack, applying a second pressure to the first cutting lines of the first substrate through the wheel unit to form a second crack having a second thickness, wherein the third thickness is greater than the first thickness,
wherein the first cutting lines are disposed between the display areas adjacent to each other and extending in a first direction and a second direction crossing the first direction, and
wherein the second pressure is greater than the first pressure.

19. The method of claim 18, wherein the first pressure is in a range from about 0.02 MPa to about 0.03 MPa, and the second pressure is in a range from about 0.10 MPa to about 0.12 MPa.

20. The method of claim 18, wherein the first crack has a thickness of about 50% to about 60% of a thickness of the second substrate, wherein the supporter has a thickness of about 40% to about 50% of the thickness of the second substrate, and wherein the second crack has a thickness of about 90% of a thickness of the first substrate.

\* \* \* \* \*